United States Patent
Ross et al.

(10) Patent No.: US 11,315,123 B2
(45) Date of Patent: Apr. 26, 2022

(54) USER AUTHORIZATION SYSTEM FOR TRANSACTIONS

(71) Applicant: Morgan Stanley Services Group Inc., New York, NY (US)

(72) Inventors: Brian Ross, Woodmere, NY (US); Zainab Memon, Jersey City, NJ (US); Jason Barrett, Yorktown Heights, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/236,808

(22) Filed: Dec. 31, 2018

(65) Prior Publication Data

US 2020/0211026 A1 Jul. 2, 2020

(51) Int. Cl.
*G06Q 20/42* (2012.01)
*G06Q 20/02* (2012.01)

(52) U.S. Cl.
CPC .......... *G06Q 20/42* (2013.01); *G06Q 20/027* (2013.01)

(58) Field of Classification Search
CPC ........ G06Q 20/4037; G06Q 20/35785; G06Q 20/42
See application file for complete search history.

(56) References Cited

U.S. PATENT DOCUMENTS

2008/0033880 A1* 2/2008 Fiebiger ............... G06Q 20/40 705/44
2015/0120650 A1* 4/2015 Seay .................. H04L 67/1097 707/610
2018/0349909 A1* 12/2018 Allen ............... G06Q 20/40145
2019/0149952 A1* 5/2019 Parks, Jr. .......... G06Q 20/0855 705/26.82

FOREIGN PATENT DOCUMENTS

JP 2009110197 A * 5/2009 ............ B29C 55/14

OTHER PUBLICATIONS

"Manager Override System for use in e-Commerce, Feb. 7, 2013, IP.com Prior Art Database Technical Disclosure, entire document" (Year: 2013).*

* cited by examiner

*Primary Examiner* — Hani M Kazimi
*Assistant Examiner* — Adam Hilmantel
(74) *Attorney, Agent, or Firm* — K&L Gates LLP

(57) ABSTRACT

A system and method for obtaining user approval for transactions. The system includes an authorization system that is communicably coupled to one or more transaction computer systems that execute at least some transactions that require user approval. When a transaction system is seeking to execute a transaction that requires user approval, the transaction system sends a user approval request to the authorization system. The authorization system then retrieves the user's communication preference from a database and transmits an affirmatively actionable message to the user according to the retrieved communication preference. The messages can include an email with an approval link to click or a text message that the can be replied to. When the authorization system receives confirmation from the user that the user approves the request, the authorization system then transmits approval for the transaction to the appropriate transaction system, which then proceeds to execute the transaction.

12 Claims, 2 Drawing Sheets

USER AUTHORIZATION SYSTEM FOR TRANSACTIONS

BACKGROUND

In many client services firms, such as financial services firms, there can be a large variety of activities performed by the firm that require affirmative client consent for each occurrence of the activity, such as moving money, paying bills, trading securities, or distributing funds. Client authorization systems that obtain authorization from the client via a phone call, a fax, or via the mail are slow, expensive, and subject to fraud.

SUMMARY

Firms providing client services often need to obtain approval from clients to execute transactions on their behalf. In one aspect, a system for obtaining user approval for transactions can include a central authorization computer system that is communicably coupled to a set of transaction computer systems that are each programmed to execute various transactions on behalf of users, such as performing wire transfers, trading securities, and so on. The authorization system can coordinate and obtain approval from the relevant user for each transaction that the transaction systems are seeking to execute by receiving a request from the transaction systems that identifies a particular transaction and the user identity associated with the transaction, retrieving the user's communication preference from a database, and then transmitting a message to the user as dictated by the retrieved communication preference. The message can include, for example, a text message, an email, a push notification delivered through a smartphone application, and any other message type to which the user can provide an affirmative response to approve the transaction. When the user approves the transaction by affirmatively responding to the message, the authorization system receives the user confirmation and then relays the approval for the transaction to the relevant transaction system, which then proceeds to execute the transaction.

The presently described system simplifies and consolidates the processes associated with obtaining approval from clients to execute various types of transactions by a firm's various systems by having each of the each of the transaction systems connected to a single authorization system, which then obtains approval from the relevant user for the relevant transaction(s). Utilizing a single system for coordinating and obtaining user approvals for transactions originating from disparate systems provides users with a single, consistent process to approve transactions in a manner that they are able to dictate through their user preferences, obviates the need for redundant storage of user communication preferences and other such data, and is more secure than conventional systems because it automates the process to obtain user approval and eliminates security risks that could arise from every individual transaction system having its own dedicated authorization process with its own potential vulnerabilities. Furthermore, the authorization system is flexible in that it can coordinate and obtain user approval for any type of transaction from any type of transaction system.

These and other benefits of the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and not to limit the scope thereof.

Figure 1:
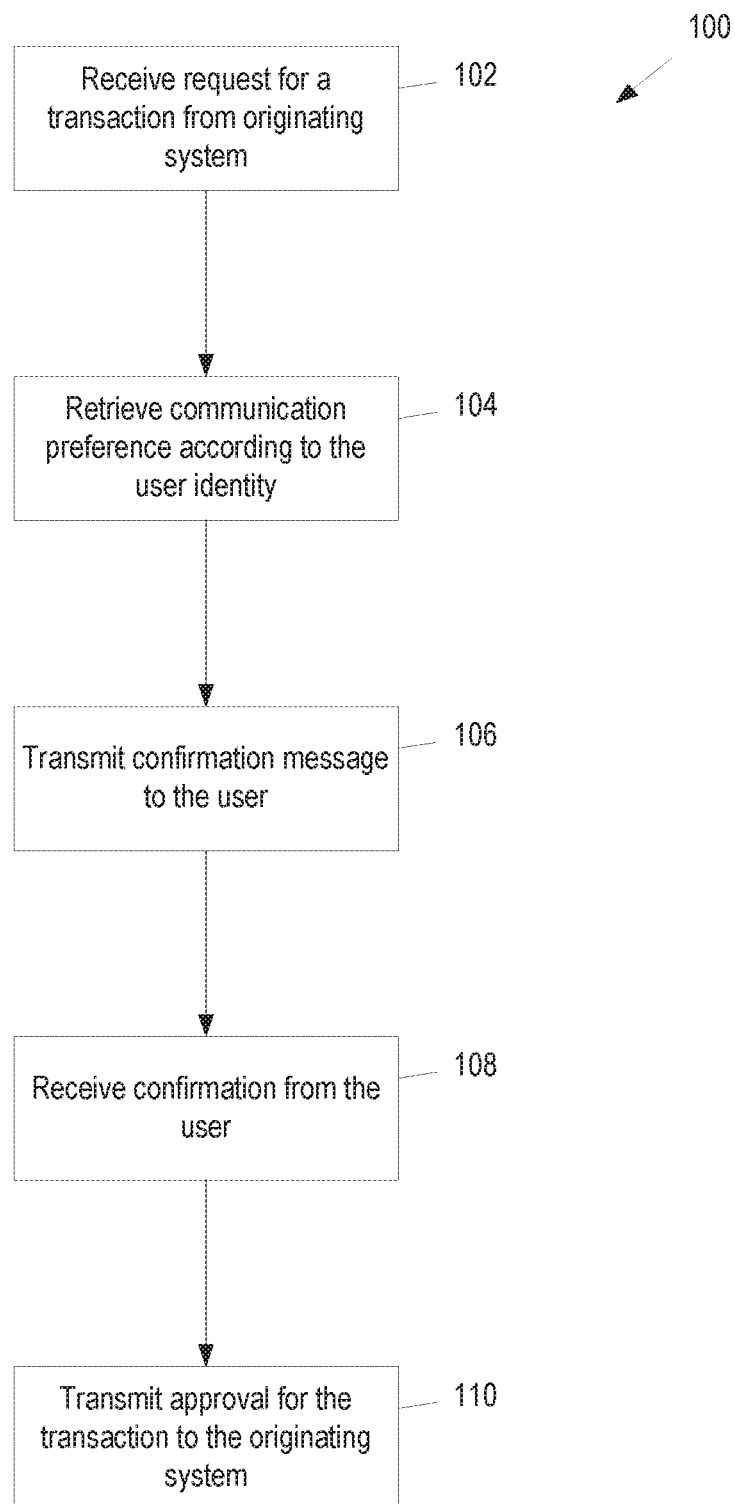
FIG. 1 illustrates a logic flow diagram of a process for obtaining user approval for a transaction, in accordance with at least one aspect of the present disclosure.
Figure 2:
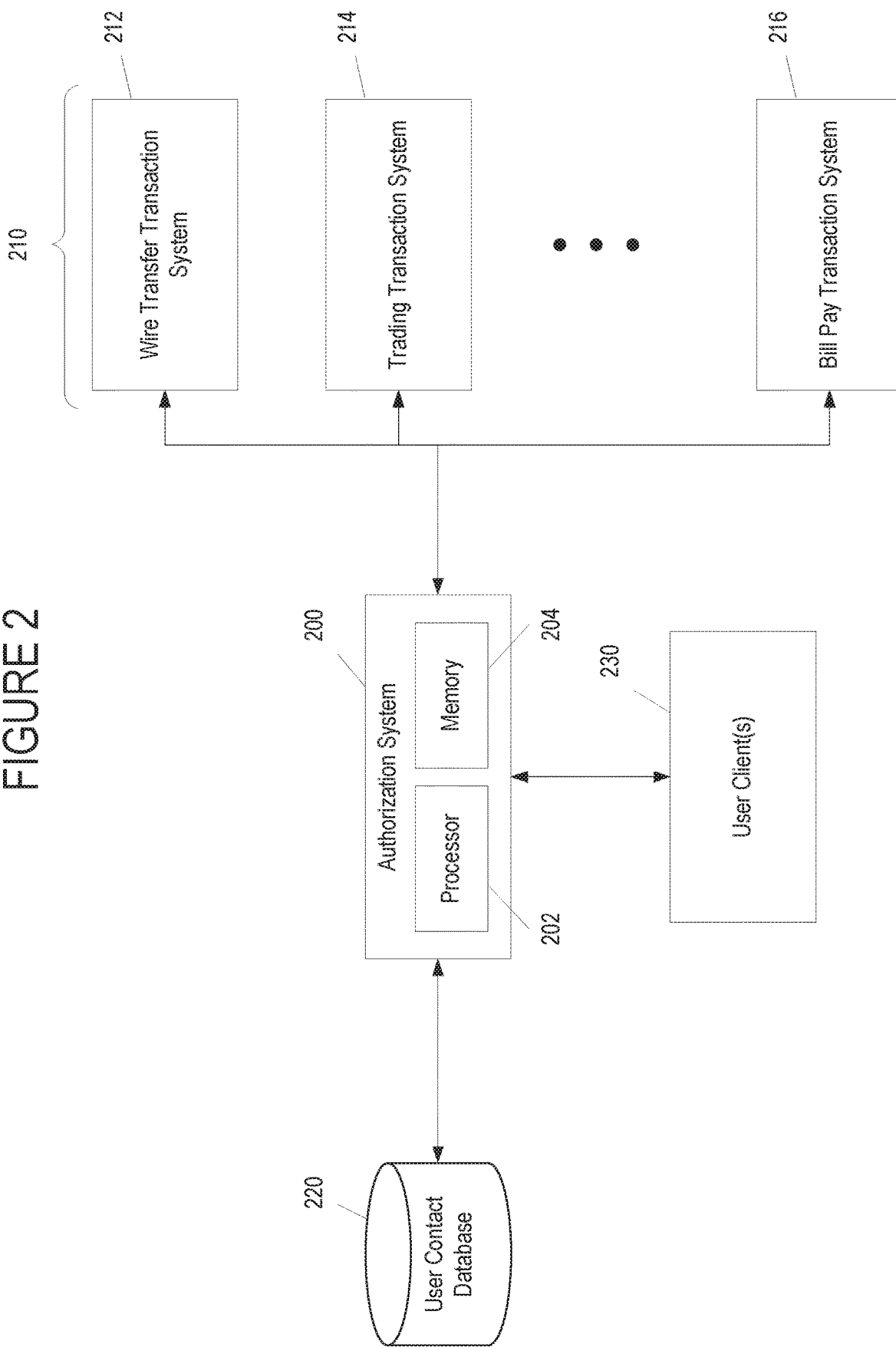
FIG. 2 illustrates a block diagram of a system for obtaining user approval for a transaction, in accordance with at least one aspect of the present disclosure.

FIG. 1 illustrates a logic flow diagram of a process 100 for obtaining user approval for a transaction, in accordance with at least one aspect of the present disclosure. In the following description of the process 100, reference should also be made to FIG. 2. In FIG. 2, an authorization system 200 is communicably coupled to a series of transaction systems 210 to form a computer network for a firm or organization. The authorization system 200 includes a computer system that is programmed to obtain user approval for transactions being carried out by the transaction systems 210. The transaction systems 210 can include a series of computer systems associated with the firm or organization for processing and executing transactions for clients that require client approval, such as a wire transfer transaction system 212, a trading transaction system 214 (e.g., for trading securities), a bill pay transaction system 216, and so on. The authorization system 200 can be connected to any number or type of transaction systems 210. In one aspect, the process 100 can be executed by a processor or control circuit, such as the processor 202 of the authorization system 200 depicted in FIG. 2. Accordingly, the process 100 can be embodied as a set of computer readable instructions stored in the memory 204 of the authorization system 200 that, when executed by the processor 202 coupled to the memory 204, causes the authorization system 200 to perform the functions described herein.

At step 102 of the process 100, the authorization system 200 receives a request to obtain user approval for a transaction from one or more of the transaction systems 210. The request can include the identity of the originating transaction system 210, the transaction type, and/or the user identity associated with the transaction. The user identity can include a username or other credentials associated with a user account, an identification number (e.g., a social security number), an email address, and so on. In one aspect, the transaction systems 210 are connected to the authorization system 200 through an application program interface so that the authorization system 200 receives data from each of the transaction systems 210 in a consistent format.

At step 104, the authorization system 200 retrieves the communication preferences for the given user identity. In one aspect, the authorization system 200 is connected to a user contact database 220 that stores the aforementioned data and the authorization system 200 queries the user contact database 220 with the user identity to retrieve the communication preference and contact information data for the given user identity. The communication preference data can indicate, for example, the user's contact information (e.g., telephone number or email), the methods of communication (e.g., push notification, text, or email) by which the user has indicated that they wish to be communicated with, whether the user wishes to be contacted via multiple different messaging mediums, and so on. The communication preference data can be, for example, selected by the user when the user establishes his or her user account with the firm and then uploaded to the user contact database 220 upon completion of the user account creation process.

At step 106, the authorization system 200 transmits a message to one or more user clients 230 (e.g., a mobile phone) delineated by the retrieved user contact information according to the retrieved contact preferences. The message can include a push notification delivered via the mobile phone app of the firm, a text message, an email, and so on, or a combination of messaging mediums, as dictated by the user's contact preferences. The message generated by the authorization system 200 is configured to obtain approval from the client. In one aspect, the message can include a uniquely generated confirmation link that, when clicked, transmits approval for the transaction to the authorization system 200. In another aspect, the message can prompt the user to reply yes or no to the message. If the user replies yes to the message, then the approval for the transaction is transmitted to the authorization system 200. In yet another aspect, the message can prompt the user to reply with or enter a code or other unique identifier associated with the user identity to confirm that the user is in fact the individual approving the transaction. In yet another aspect, multiple messages in different messaging mediums can be sent to the user contact information requiring tandem action for the transaction to be approved. For example, the user can be sent an email with a link to enter a code to approve the transaction and a text containing the code. Any of these or other techniques, such as multi-factor authentication techniques, can be utilized to transmit messages to users to obtain approval for transactions. The authorization system 200 may include or be connected to various notification systems for initiating the transmission of messages to users. In one aspect, the authorization system 200 can publish messages to a notification system, such as Amazon Simple Notification Service or Google Cloud Messaging, which then sends the message via SMS, a push notification, or another messaging medium, as desired.

At step 108, the authorization system 200 receives confirmation from the user. The manner in which the confirmation is received depends upon the medium by which the message was transmitted, as described above. For example, if an email containing a verification link is transmitted to the user, clicking the link can execute a script that updates a database entry indicating that the user has clicked the link. Accordingly, the authorization system 200 can query the database and determine whether confirmation has been received from the user based on the corresponding database entry. As another example, if a text message prompting the user to reply yes or no to the message has been sent to the user, the reply to the text message can be relayed to the notification system (e.g., Google Cloud Messaging), which then relays the message to the authorization system 200 in association with the user credentials (e.g., cell phone number). Accordingly, the authorization system 200 can determine whether the reply indicates that the user approves the transaction (i.e., the reply text message is "y," "yes," "approved," and so on). In some aspects, additional techniques can be utilized the client from which confirmation is received by the authorization system 200, such as multi-factor authentication technique or determining whether the confirmation was sent from a device that was pre-registered by the user associated with the transaction. Upon receiving confirmation from the user, the authorization system 200 determines the identity of the transaction system 210 to which the user approval is to be communicated and then, at step 110, transmits said approval to the originating transaction system 210. Upon receiving the user approval, the particular transaction system 210 can then proceed to execute the transaction (e.g., initiate the wire transfer or move the designated money between bank accounts).

In one aspect, the authorization system 200 can be programmed to transmit separate confirmation messages for each individual transaction for which a transaction system 210 is seeking approval. In another aspect, the authorization system 200 can be programmed to wait for a particular time interval prior to transmitting a confirmation message to the user (at step 106). The time interval can be on the order of milliseconds, seconds, minutes, and so on. If any additional requests associated with the given user identity are received by the authorization system 200 from either the same or different transaction systems 210 during that time interval, the authorization system 200 can be programmed to transmit a single confirmation message to the user device indicated by the retrieved contact information for the batch of approval requests. Accordingly, the authorization system 200 can be programmed to transmit approval for the batch of transactions to the originating transaction system 210 associated with each approval request (at step 110) when confirmation is received from the user (at step 108). In this aspect, the authorization system 200 is configured to seek simultaneous approval for multiple transactions requiring user approval, streamlining the approval process for the client and avoiding the need to send an individual message (or set of messages) for each and every approval request.

In various aspects, the authorization system 200 can include various software modules or applications for performing its functions. For example, the authorization system 200 can include a workflow engine for managing requests received from the transaction systems 210, transmitting messages to users to obtain approvals, waiting to receive approvals from users prior to executing subsequent operations, communicating the user's approval of a transaction to the appropriate transaction system 210, and so on. As another example, the authorization system 200 can include a routing and delivery engine for generating the messages transmitted to the users according to the users' contact preferences, publishing the messages to the relevant notification system to deliver the message in the preferred format, and receiving replies and/or approvals from the users to the messages. In one aspect, the workflow engine and/or routing and delivery engine can manage expiration timers for user approvals. In this aspect, if user approval is not received within a particular time period, then the user approval request expires and any subsequently received user approval received in response to the confirmation message disregarded with respect to approving the particular transaction.

This aspect of the authorization system 200 ensures that user approvals are only honored for a particular amount of time. In some aspects, if the workflow engine and/or routing and delivery engine receive a stale confirmation, then the authorization system 200 can transmit a message to the client indicating that the user approval request has expired (and has thus been disregarded) and/or reinitiate the process for obtaining user approval.

The authorization system 200 provides a centralized system for obtaining user approval for transactions that is agnostic to the type and structure of the originating transaction system for the request, obviating the need for each individual transaction system to separately and independently obtain user approval for its own transactions. Further, the authorization system 200 reduces transaction times and improves the client experience by immediately and automatically notifying clients of required approvals for transactions and allowing clients to securely provide approvals for the transactions via their mobile phone. In some aspects, the authorization system 200 also reduces transaction times by allowing for bulk approval of transactions across multiple different transaction systems 210 by responding to a single approval message. Still further, the authorization system 200 reduces fraud by superseding outdated methods for obtaining approval from clients (e.g., faxes or phone calls). Still further, the authorization system 200 reduces administrative expenses by eliminating the need for any forms or faxes to be handled by branch personnel for the firm. Finally, the authorization system 200 eliminates administrative errors by obviating the need for branch personnel to manually enter data into forms or client records.

In various aspects, the authorization system 200 can be colocated with or located remotely from one or more of the transaction systems 210 and/or the user contact database 220. In various aspects, the authorization system 200 can be connected to the transaction systems 210 and/or the user contact database 220 via wired or wireless connections.

The computer systems described herein, such as and including the authorization computer system 200 and the transaction computer systems 210, could be implemented with one or a number (e.g., a network or cluster) of computer devices, such as servers, mainframes, etc. The computer systems may comprise one or more processors (e.g., the processor 202) and computer memory (e.g., the memory 204). The processors may comprise CPUs and/or GPUs. The computer memory may comprise primary storage (e.g., ROM, RAM) and/or secondary storage (e.g., HDD, flash, SSD), for example.

The software modules described herein may be implemented as software code to be executed by the processor(s) of the computing systems using any suitable computer language, such as, for example, JavaScript, C #, C++, or Python using, for example, functional or object-oriented techniques. The software code may be stored as a series of instructions or commands in the computer memories.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A computer-implemented method for obtaining client approvals for transactions by clients of a firm, where the firm has multiple disparate transaction systems that execute different types of transactions and wherein certain transactions require client approval for executing the transactions, wherein the transactions comprise financial transactions, the method comprising:

storing, in a client communication preference database that is part of a database system, communication preferences for the clients for obtaining client approvals from the clients, wherein the communication preferences for each client comprise a communication address to send client approval requests and a communication type for the client approval request;

receiving, by a central authorization computer system of the firm that is communicably coupled to the multiple disparate transaction systems of the firm, a first request for client approval from a first client for a first transaction to be executed by the first requesting transaction system that is one of the multiple disparate transaction systems of the firm, wherein the central authorization computer system communicates with each of the multiple, disparate transaction systems via application programming interfaces, such that the central authorization computer system communicates with each of the multiple, disparate transaction systems using a consistent message format, and wherein the central authorization computer system is for obtaining client approvals for clients of the firms for transactions by the clients that require client approval for any of the multiple, disparate transaction systems;

in response to receiving the first request, retrieving, by the central authorization computer system from client communication preference database, the communication address and the communication type for the first client;

after retrieving the communication address and communication type for the first client, transmitting, by the central authorization computer system, a first digital message, according to the communication type for the first client, to the first client at the communication address for the first client, wherein the first digital message comprises a confirmation link that is affirmatively actionable by the first client to approve the first transaction;

upon the first client activating the link to confirm the first transaction, executing, by the central authorization computer system, a script to update an entry in the database system, wherein the entry indicates that the first client activated the confirmation link in the first digital message to approve the first transaction;

after executing the script to update the entry in the database system, querying, by the central authorization computer system, the database to determine whether the first client approved the first transaction;

upon a determination that the first client approved the first transaction, determining, by the central authorization computer system, which of the multiple, disparate transaction systems to forward the client approval; and upon determining which of the multiple, disparate transaction systems to forward the client approval, transmitting, by the central authorization computer system, the client approval to the first requesting transaction system; and executing, by the first requesting transaction system, the first transaction upon the first requesting transaction system receiving the client approval for the first transaction.

2. The computer-implemented method of claim 1, wherein the first digital message is selected from the group consisting of a text message, a push notification, and an email.

3. A computer system of a firm, the computer system comprising:
   multiple, disparate transaction systems for executing transactions for clients of the firm, wherein each of the multiple, disparate transaction systems execute different types of transactions and wherein certain transactions by each of the multiple, disparate transactions systems require client approval for executing the transactions, wherein the transactions comprise financial transactions; and
   a central authorization computer system that is communication with each of the multiple, disparate transaction systems, wherein:
      the central authorization computer system is for obtaining client approvals for clients of the firm for transactions by the clients that require client approval for any of the multiple, disparate transaction systems;
      the central authorization computer system communicates with each of the multiple, disparate transaction systems via application programming interfaces, such that the central authorization computer system communicates with each of the multiple, disparate transaction systems using a consistent message format; and
      the central authorization computer system comprises:
         a database system that comprises a contact database, wherein the contact database stores communication preferences for the clients for obtaining client approvals from the client, wherein the communication preferences for each client comprise a communication address to send client approval requests and a communication type for the client approval request;
         a processor; and
         a memory coupled to the processor, the memory storing instructions that, when executed by the processor, cause the central authorization computer system to:
            receive a first request from a first requesting transaction system for client approval from a first client for a first transaction to be executed by the first requesting transaction system, wherein the first requesting transaction system is one of the multiple, disparate transaction systems;
            in response to receiving the first request, retrieve, from the contact database, the communication address and communication type for the first client;
            after retrieving the communication address and communication type for the first client, transmit a first digital message, according to the communication type for the first client, to first client at the communication address for the first client, wherein the first digital message comprises a confirmation link that is affirmatively actionable by the first client to approve the first transaction;
            upon the first client activating the link to confirm the first transaction, execute a script to update an entry in the database system, wherein the entry indicates that the first client activated the confirmation link in the first digital message to approve the first transaction;
            after executing the script to update the entry in the database system, query the database system to determine whether the first client approved the first transaction;
            upon a determination that the first client approved the first transaction, determine which of the multiple, disparate transaction systems to forward the client approval; and
            upon determining which of the multiple, disparate transaction systems to forward the client approval, forward the client approval for the first transaction to the first requesting transaction system to cause the first requesting transaction system,
      wherein the first requesting transaction system is for executing the first transaction upon receiving the client approval for the first transaction.

4. The computer system of claim 3, wherein the first digital message is selected from the group consisting of a text message, a push notification, and an email.

5. The method of claim 1, further comprising:
   after receiving the first request, receiving, by the central authorization computer system, a second request from a second requesting transaction system for client approval from the first client for a second transaction to be executed by the second requesting transaction system, wherein the second requesting transaction system is one of the multiple, disparate transaction systems and is different from the first requesting transaction system;
   in response to receiving the second request, retrieving, by the central authorization computer system from the client communication preference database, the communication address and communication type for the first client;
   after retrieving the communication address and communication type for the first client, transmitting, by the central authorization computer system, a second digital message, using the communication type for the first client, to the first client at the communication address for the first client, wherein the second digital message comprises a second confirmation link that is affirmatively actionable by the first client to approve the second transaction;
   upon the first client activating the link to confirm the second transaction, executing, by the central authorization computer system, the script to update a second entry in the database system, wherein the second entry indicates that the first client activated the second confirmation link in the second digital message to approve the second transaction;
   after executing the script to update the second entry in the database system, querying, by the central authorization computer system, the database system to determine whether the first client approved the second transaction;
   upon a determination that the first client approved the second transaction, determining, by the central authorization computer system, which of the multiple, disparate transaction systems to forward the client approval;

upon determining which of the multiple, disparate transaction systems to forward the client approval, forwarding, by the central authorization computer system, the client approval for the second transaction to the second requesting transaction system; and executing, by the second requesting transaction system, the second transaction upon receiving the client approval for the second transaction.

6. The computer-implemented method of claim 5, wherein the first requesting transaction system comprises a wire transfer transaction system, and the second requesting transaction system comprises a securities trading transaction system.

7. The method of claim 1, wherein:
the method further comprises:
waiting, by the central authorization computer system, a threshold time interval after receiving the first request before transmitting the first digital message; and
within the threshold time interval, receiving, by the central authorization computer system, a second request from a second requesting transaction system for client approval from the first client for a second transaction to be executed by the second requesting transaction system, wherein the second requesting transaction system is one of the multiple, disparate transaction systems and is different from the first requesting transaction system; and
the first digital message is affirmatively actionable by the client to approve both the first transaction and the second transaction.

8. The method of claim 1, wherein the first request comprises an identifier for the first requesting transaction system.

9. The computer system of claim 3, wherein the first request comprises an identifier for the first requesting transaction system.

10. The computer system of claim 3, wherein the instructions stored by the memory further cause the central authorization system to:
after receiving the first request, receive a second request from a second requesting transaction system for client approval from the first client for a second transaction to be executed by the second requesting transaction system, wherein the second requesting transaction system is one of the multiple, disparate transaction systems and is different from the first requesting transaction system;
in response to receiving the second request, retrieve, from the contact database, the communication address and communication type for the first client;
after retrieving the communication address and communication type for the first client, transmit a second digital message, using the communication type for the first client, to the first client at the communication address for the first client, wherein the second digital message comprises a second confirmation link that is affirmatively actionable by the first client to approve the second transaction;
upon the first client activating the link to confirm the second transaction, execute the script to update a second entry in the database system, wherein the second entry indicates that the first client activated the second confirmation link in the second digital message to approve the second transaction;
after executing the script to update the second entry in the database system, query the database system to determine whether the first client approved the second transaction;
upon a determination that the first client approved the second transaction, determine which of the multiple, disparate transaction systems to forward the client approval; and
upon determining which of the multiple, disparate transaction systems to forward the client approval, forward the client approval for the second transaction to the second requesting transaction system; and
wherein the second requesting transaction system executes the second transaction upon receiving the client approval for the second transaction.

11. The computer system of claim 10, wherein the first requesting transaction system comprises a wire transfer transaction system, and the second requesting transaction system comprises a securities trading transaction system.

12. The computer system of claim 3, wherein:
the instructions stored by the memory further cause the central authorization system to:
wait a threshold time interval after receiving the first request before transmitting the first digital message; and
within the threshold time interval, receive a second request from a second requesting transaction system for client approval from the first client for a second transaction to be executed by the second requesting transaction system, wherein the second requesting transaction system is one of the multiple, disparate transaction systems and is different from the first requesting transaction system; and
the first digital message is affirmatively actionable by the client to approve both the first transaction and the second transaction.

\* \* \* \* \*